Figure 5:
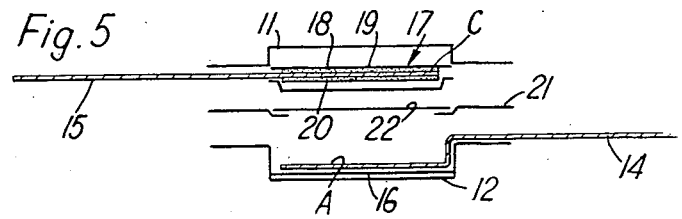

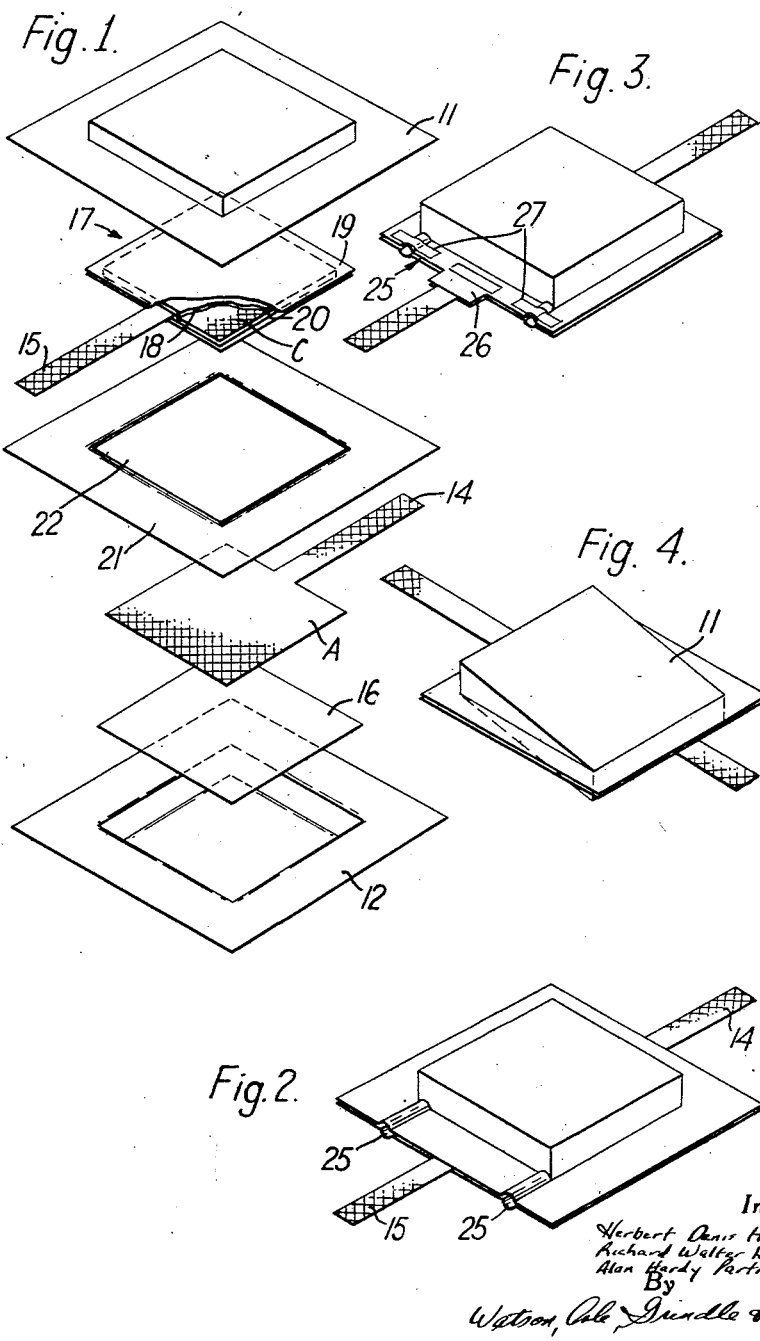

March 20, 1962 H. D. HUGHES ET AL 3,026,365
ELECTRIC PRIMARY CELLS

Filed March 17, 1959 2 Sheets-Sheet 2

Inventors
Herbert Denis Hughes
Richard Walter Lewis and
Alan Hardy Partridge
By
Watson, Cole, Grindle & Watson
Attorneys United States Patent Office 3,026,365
Patented Mar. 20, 1962

3,026,365
ELECTRIC PRIMARY CELLS
Herbert D. Hughes, Banstead, Richard W. Lewis, Esher, and Alan H. Partridge, Horsham, England, assignors to Metachemical Processes Limited
Filed Mar. 17, 1959, Ser. No. 800,043
Claims priority, application Great Britain Mar. 21, 1958
15 Claims. (Cl. 136—100)

The present invention relates to improvements in electric primary cells, and to batteries comprising a plurality of such cells.

The object of the present invention is to provide a primary cell which has long-term stability, that is to say, it can be stored for lengthy periods without any substantial deterioration in the properties of the cell and without danger of loss or leakage of electrolyte.

Various systems of electrodes and electrolytes have been proposed for primary cells but the systems and constructions previously known are liable to produce gas during storage or on discharge and, therefore, it has been necessary to provide a vent of some sort to permit such gas to be evacuated from the cell proper. The provision of such vents necessarily also permits the entry of air to the inside of the cell, which tends to accelerate undesired chemical reactions, and these conditions do not provide the requirements for high stability and storage over long periods.

More specifically the object of the present invention is to provide a primary cell which has long-term stability, and in which the cell is hermetically sealed so as to prevent egress of electrolyte and the entry of air into the cell proper.

The present invention is based on the discovery that indium or alloys consisting mainly of indium are highly stable in alkaline solutions, such as caustic soda and caustic potash solutions, and can be advantageously employed as the anode in a primary cell, and the invention comprises a cell including an anode of indium or an indium alloy, an electrolyte consisting of a caustic alkali solution and a cathode consisting of a support and a depolariser. Such a system does not evolve gas during storage or while on discharge and is consequently suitable for use in hermetically sealed conditions, thus preventing ingress of air and egress of any possible small quantities of the electrolyte.

Since indium is an extremely soft metal it is conveniently carried by a support of another metal such as nickel. The cathode may include a similar support. Each cell may conveniently be assembled in a casing of suitable shape formed of pressed plastic sheet and with suitable external connections whereby several such cells may be assembled to form a battery, the construction of each cell being such that it is hermetically sealed. Expanded or perforated nickel sheet may be employed as the anode and cathode supports, and in the case of the anode a layer of indium or indium alloy as specified hereinafter can be applied to such nickel by rolling a thin foil of indium or alloy thereon or by a plating process. In the case of the cathode an expanded or perforated nickel support may be covered with a layer of a suitable depolarising agent which may then be enclosed within a sheath or covering of a suitable permeable material.

Each cell may consist of two flanged casing sections fastened together around their edges and hermetically sealed, an electrolyte being introduced into the cell after the two casing sections have been joined, conveniently by vacuum filling techniques after which the cell is hermetically sealed.

It has been found that indium alone in conjunction with an alkaline electrolyte will only support a current of the order of .7 ma. per square cm. of active surface, but that if the indium is alloyed with another metal, such as bismuth, this value of current may be raised to 20 ma. while preserving the advantage of long-term stability. It is preferred to employ alloys consisting of 90 to 99% indium and 10 to 1% of bismuth by weight. Both metals should be of high purity and in each case the total of impurities should not exceed 0.1%.

An electrode system of this character and using such an indium-bismuth alloy with an aqueous solution of potassium hydroxide as the electrolyte, has an E.M.F. of about 1.14 volts and the cell dimensions are such that for a given ampere hour capacity it is of about the same size as a cell employing a zinc anode, and, moreover, has the advantages of long-term stability, i.e. it provides a battery which can be stored for lengthy periods without danger of deterioration during storage and which is ready for immediate use whenever required.

Various constructions of primary cell according to the present invention and the production thereof are illustrated in diagrammatic form on the accompanying drawings in which:

FIG. 1 is an exploded view showing the components of one form of primary cell,

FIG. 2 shows the cell after the components have been brought into position but before sealing at the edges, FIG. 3 is a perspective view showing the finished cell after filling and sealing, FIG. 4 is a perspective view showing a modified form of the cell, and FIGS. 5 to 9 are sectional views showing constructions of cells according to the present invention, the component parts being shown in spaced-apart condition, FIG. 5 corresponding to FIG. 1, while FIGS. 6 to 9 illustrate other forms of cell.

Referring now to FIG. 1 of the drawing, it will be seen that the cell comprises top and bottom casing sections 11, 12, which may consist of pressed thermo-plastic sheet consisting for example of polyvinyl chloride or other suitable impermeable alkali-resistant material which may conveniently be transparent. Each casing section is formed with a square shaped, comparatively shallow depression and with an outwardly directed flange.

An anode A and a cathode C each consist of a support consisting of expanded or perforated nickel sheet, and each support consists of a square portion adapted to fit within the dished part of the casing sections 11 and 12, and an outwardly directed pigtail which projects externally of the finished cell as shown at 14 in the case of the anode and at 15 in the case of the cathode. The anode has a coating of an indium-bismuth alloy, such as one of the alloys specified above, and it may comprise a foil of about .075 mm. to .38 mm. thick rolled on to the surface of the carrier facing the cathode C.

The anode A is bedded on a piece of mineral wax 16 about .4 mm. thick, supplied in the form of a thin sheet. The material known as "Master Wax" may be used. On assembly this piece of wax sheet 16 fits into the base of the casing section 12 as shown in FIG. 5 in section, and the anode A is pressed down into contact with said wax by means of a heated plunger.

The casing section 11 serves to accommodate the cathode assembly indicated generally at 17 in FIG. 1. This assembly comprises the perforated nickel support and a mass or pellet of depolariser 18 consisting of the following mixture (by weight parts):

Mercuric oxide _____ 90
Graphite _____ 10

The mercuric oxide may be replaced by other oxidising agents such as manganese peroxide. It may be formed into a stiff paste with distilled water and then formed as a pellet on the nickel carrier. It may be about 1.25 mm. thick. The cathode and the pellet are laid upon a sheet of thin polythene 19 treated at least at its edges to render it adhesive and a sheet of Fibre Fabric 20 is laid over the pellet, the edges being brought into contact with the edges of the polythene sheet and held in contact therewith by the adhesive property thereof. The Fibre Fabric referred to is a commercial product which consists of rayon fibres bonded with viscose and is a paper-like material. It may if desired be replaced by an alkali resistant paper such as a suitable grade of filter paper. The cathode assembly so formed is placed in or forced into the upper casing section 11 and the two sections 11 and 12 supporting the cathode assembly 17 and the anode A can then be assembled with the interposition of a membrane 21 consisting of a piece of highly plasticised polyvinyl chloride having a square window aperture therein into which a piece of alkali-resistant material 22, such as a suitable grade of filter paper, has been attached, for example by plastic welding processes. This material 22 has the purpose of preventing migration of mercury (or other reduced metal) from the depolariser mass towards the anode.

FIG. 5 is a sectional view through the components of the complete cell with the parts shown prior to assembly in order that the arrangement of the different parts of the cell can be clearly seen. It will, of course, be understood that the finished cell is very compact since the cathode assembly 17 is pressed into the casing section 11 during the assembly operations. The next stage is the application of heat and pressure to the superposed flanges of the two casing sections 11 and 12, to form a fluid-tight and hermetically sealed assembly, migration of the plasticiser from the membrane 21 permitting the flanges to be satisfactorily welded together. This may be performed by heated presser elements or by high frequency welding techniques.

In order to permit filling with electrolyte of any of the forms of cell herein described, it is preferred to adopt a vacuum filling technique, and for this purpose and as indicated in FIG. 2, in the course of assembly in the cell a pair of ducts 25 are formed in the superposed flanges, for example by placing pieces of wire between the flanges when they are being later withdrawn. If the cell is then treated in a vacuum chamber, immersed in electrolyte, and the surrounding pressure restored to the normal value, the cell will become substantially filled with the electrolyte, after which the ducts 25 can be sealed off by a further application of pressure. Finally, the superposed flanges are trimmed off leaving the anode and cathode pigtails 14, 15 projecting externally of the cell as shown in FIG. 3. As seen therein the flange is trimmed so as to leave a projecting portion 26 around each pigtail for additional strength, and FIG. 3 also shows the sealing off of the two ducts 25 by means of transverse lines of sealing as indicated at 21.

The electrolyte referred to may conveniently consist of a 50% by weight aqueous solution of potassium hydroxide, although other alkali-metal solutions such as sodium hydroxide can also be used.

FIG. 4 illustrates another construction of cell which may be applied to any of the embodiments herein described and wherein instead of each casing section 11 and 12 being of uniform depth and with the assembled flanges of the two sections arranged equatorially, each casing section may be of triangular form as seen in cross-section along one axis, i.e. the axis containing the two pigtails 14, 15. Two similarly shaped casing sections arranged with the deeper section of one facing the shallower section of the other provides jointing flanges along the top and bottom edges respectively of two opposed sides and obliquely directed flanges along the other two opposed sides. Such cells offer the advantage that in the production of a battery the successive pigtails to be connected together for the purpose of connecting the several cells in series, lie closely adjacent and can be readily interconnected by simple means.

*Example*

The following is an example of a cell shown in FIGS. 1 and 5, and illustrates the technical advantages of the invention. The casing section 11 has a depth of 1.7 mm. and the casing section 12 has a depth of 3 mm. The thickness of the depolariser pellet 18 surrounding the expanded nickel support is 1.25 mm.–1.4 mm. The complete cell has the following overall dimensions:

| | |
|---|---|
| Thickness mm | 5.33 |
| Length and breadth mm | 27.7 |
| Volume ccs | 47 |
| Weight gm | 11 |

This cell offers the following electrical properties:

| | |
|---|---|
| Ampere hour capacity | .78 |
| Watt hour capacity | .87 |
| Ampere hours per cc | .165 |
| Watt hours per cc | .182 |
| Ampere hours per gm | .071 |
| Watt hours per gm | .078 |

It will, of course, be understood that the electrical properties referred to above apply to cell constructions to the order of size specified above.

Figure 6:
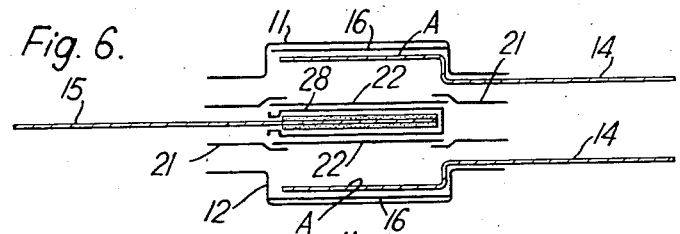

To secure maximum capacity for the particular cell referred to in the above example the discharge rate should not exceed 20 ma. It is possible, however, to increase the discharge rate for maximum capacity by utilising a construction embodying two anodes placed one on each side of a central cathode structure and an arrangement of this kind is illustrated in FIG. 6 in the same manner as shown on FIG. 5 of the drawings. In this case the two casing sections 11, 12 are of the same dimensions and each houses a sheet of mineral wax 16 and an anode structure A similar to that already described with reference to FIGS. 1 and 5. The cathode carrier C is surrounded by a pellet of depolariser material 18 as in FIGS. 1 and 5, and this pellet is surrounded by a covering or bag-like element 28 of plasticised polyvinyl chloride.

The cathode assembly so formed is enclosed on each side by a membrance 21 of plasticised polyvinyl chloride having a window aperture therein to which a piece of alkali-resistant paper 22 has been welded in the same way as already described with reference to FIGS. 1 and 5. The two membranes are preliminarily welded together around the cathode assembly to form a complete unit which is then placed in position as indicated in FIG. 6 before the two casing sections are placed together and welded to form the complete unit. During such welding operations the plasticiser present in the discs 21 tends to migrate and to allow softening of the flange edges of the casing sections 11 and 12 so that a complete and fluid-tight assembly results during the application of heat and pressure, thus forming a hermetically sealed unit which may be filled by the formation of ducts 25 and by vacuum filling techniques, as already explained with reference to FIG. 2.

As an example, a cell of this character having the dimensions specified above for a cell of the type shown in FIGS. 1 and 5 but having a total thickness of 4.14 mm. provides the same electrical properties as those specified, but the permissible discharge rate is increased to 40 ma. for the same maximum capacity.

Figure 7:
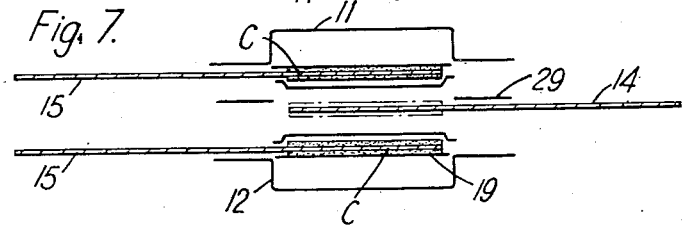

FIG. 7 illustrates a form of cell having twin cathode assemblies and a single anode and which aims at offering a higher maximum discharge rate than can be obtained by the cells already described. An indium-bismuth alloy foil is applied to both faces of the anode carrier and rolled into position. This anode is positioned centrally in the cell and is surrounded on each side by a cathode assembly similar to that shown in FIGS. 1 and 5 comprising a pellet 18 of depolariser material positioned upon a sheet 19 of polythene made adhesive at its edges and covered with a cover sheet 20 of alkali resistant paper.

A ring or gasket 29 of highly plasticised polyvinyl chloride is positioned between the superposed flanges of the top and bottom casing sections so that when the parts of the cell are assembled the plasticiser from the ring 29 migrates into the cell flanges and permits the complete cell to be permanently assembled to a hermetically sealed unit which may then be filled by vacuum filling techniques as already explained.

Figure 8:
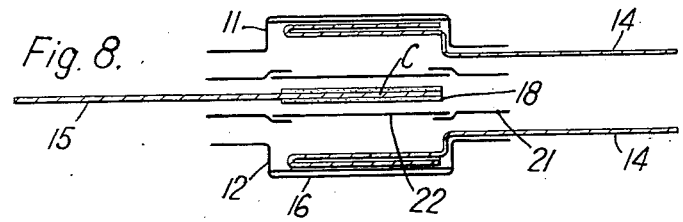

The embodiment shown in FIG. 8 is intended to provide a cell having a higher permissible rate of discharge for short periods. In this case two anode carriers are provided as shown in FIG. 6, said anodes being fitted into the upper and lower casing sections 11, 12. In this case, however, each anode carrier is plated with an indium-bismuth alloy to a thickness of .06 mm. to provide a high anode surface area. The cathode assembly includes the cathode support C and a pellet 18 of depolariser material but not enclosed in this case by any covering similar to that already described. The pellet is disposed between membranes 21 of polymerised material having window portions welded therein 22 consisting of alkali-resistant paper (as in FIG. 6). These membranes may be preliminarily welded together around the cathode and on assembly of the complete cell the plasticiser migrates into the flange portions of the casing sections to permit the complete cell to be assembled and hermetically sealed as already explained, the cell being filled with electrolyte by vacuum filling techniques as already explained.

A cell of the character referred to and of the dimensions set out in the above example, but having a total thickness of 6.1 mm. provides a maximum permissible discharge rate of 300 ma. for a five minute period. In this connection it will, of course, be understood that this discharge rate is above that which permits the maximum capacity of the cell to be secured.

In the foregoing figures it will be seen that the leads to the anode and cathode in the form of the pigtails 14, 15 are taken through the superposed flanges of the two casing sections 11, 12, the sealing together of these two flanges providing a hermetic seal around the exit point of the pigtails.

Figure 9:
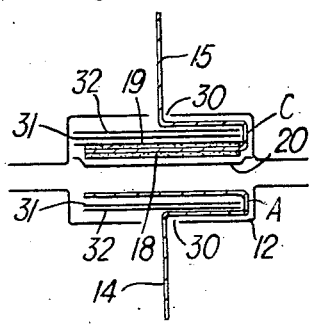

FIG. 9 illustrates an alternative arrangement based on the embodiment of FIGS. 1 and 5, but can be applied also on the constructions of FIGS. 6 to 8, wherein the pigtail connections to the cathode and anode are taken through the centres of the flat faces of the casing sections 11 and 12 which for this purpose are provided with apertures 30. As will be seen from FIG. 9 the anode A has a pigtail 14 which is bent re-entrantly along the base of the anode and along the inside of the casing section 12 towards and through the aperture 30. Two discs 31, 32 of plastic material are provided, the disc 31 being a comparatively hard material, while the disc 32 is comparatively soft, for example it may be a highly plasticised material. As a preliminary operation the assembly consisting of the anode, the discs 31, 32 and the casing section 12 are subjected to heat and pressure to cause the discs 31 and 32 to be welded into the bottom of the casing section thus providing a hermetic seal around the aperture 30. The same procedure is adopted for the cathode assembly C which otherwise is arranged as shown on FIGS. 1 and 5, two similar discs 31, 32 again providing a hermetic seal about the aperture 30 for the cathode pigtail 15. After assembly of the two casing sections 11 and 12 around the flanged edges thereof, the cell is filled with electrolyte as already described, finally sealed and the flange edge then trimmed and since no connections are brought through said flanges they can be trimmed to comparatively small dimensions.

What we claim is:

1. An electric primary cell comprising a hermetically sealed outer casing, a cathode and an anode accommodated within said outer casing, said anode and said cathode each including a support surface formed of expanded metal and each having an integral extension connection member also formed of the same expanded metal leading to the outside of said casing in sealed relation thereto, an active covering on said anode including a foil selected from a material containing a range of 90 to 99% indium and 10 to 1% bismuth, both metals being of high purity and containing not more than 0.1% total of impurities and an alkaline solution electrolyte within said outer casing.

2. An electric primary cell as claimed in claim 1, wherein the outer casing is formed from two flanged shells, each of dished form, with the flanged edges of said shells welded together to form a hermetic seal.

3. An electric primary cell as claimed in claim 1, wherein said outer casing is formed from two flanged shells of dished form and wherein the expanded metal extension members project from said anode and said cathode between said flanged edges, said edges being welded together to form a hermetic joint encircling the extension members.

4. An electric primary cell as claimed in claim 1, wherein said outer casing is formed from two flanged shells, each of dished form, and wherein the integral extension members of expanded metal of said cathode and anode project through centrally positioned apertures in said shells, said casing being hermetically sealed by welding said flanged edges, said extension members of expanded metal being sealed against the inside of said casing shells by means of welded discs of plastic material.

5. An electric primary cell according to claim 1 wherein the cathode support carries a depolariser selected from mercuric oxide and manganese peroxide.

6. An electric primary cell according to claim 5 wherein the cathode includes a pellet or covering of mercuric oxide and graphite.

7. An electric primary cell according to claim 6 wherein the cathode is enclosed by a covering of polythene.

8. An electric primary cell according to claim 6 wherein the cathode is placed between a piece of polythene and a piece of porous material stuck to the polythene at its edges.

9. An electric primary cell according to claim 1 wherein said cell comprises a pair of casing sections and each casing section has a depression of uniform depth and the sealing flange is arranged equatorially of the finished cell.

10. An electric primary cell according to claim 1 wherein said cell comprises a pair of casing sections and each casing section is of tapered depth, the deeper portion of one section being arranged opposite the shallower portion of the other section so that on two opposed faces the joined flanges run obliquely from near one face to near the opposite face.

11. An electric primary cell according to claim 1 comprising an expanded metal anode covered with an indium-bismuth alloy seated upon a piece of mineral wax, said anode being housed in one casing section having a flanged edge, a membrane element adapted to overlie said anode having a window portion welded therein consisting of alkali-resistant paper, a cathode including a mass of depolariser material housed in the other container section and a filling of caustic alkali between the two casing sections, the latter being hermetically sealed around its edges.

12. An electric primary cell according to claim 1 comprising two casing sections each housing an anode seated upon a piece of mineral wax each anode having a covering of an indium-bismuth alloy, a centrally positioned cathode including a mass of depolariser housed in a bag-like element of plasticised polyvinyl chloride and a pair of membrane elements, one on each side of the cathode with the edge parts thereof positioned between flange portions of the casing sections, all the parts being hermetically sealed around the flanged edges and filled with a caustic alkali solution.

13. An electric primary cell according to claim 1 comprising two flanged casing sections each having a cathode located therein, a single anode positioned centrally between said cathodes and a gasket of plasticised polyvinyl chloride positioned between the flanges of the casing sections, the casing sections being hermetically sealed around the flanged edges and the cell being filled with caustic alkali solution.

14. An electric primary cell according to claim 1 comprising two casing sections each housing an anode having a thin plating of indium-bismuth alloy, a centrally positioned cathode consisting of a support and a mass of depolariser material, and membrane elements on each side thereof having window portions welded therein consisting of alkali-resistant paper, the cell being hermetically sealed and filled with a caustic alkali solution.

15. An electric primary cell comprising a hermetically sealed outer casing, a cathode and an anode accommodated within said outer casing, said anode and said cathode each including a support surface formed of expanded metal and each having an integral extension connection member also formed of the same expanded metal leading to the outside of said casing in sealed relation thereto, an active covering on said anode consisting of a foil containing an indium active component and an alkaline solution electrolyte within said outer casing.

References Cited in the file of this patent

UNITED STATES PATENTS

| | | |
|---|---|---|
| 2,627,534 | Arbogast | Feb. 3, 1953 |
| 2,666,802 | Woodring et al. | Jan. 19, 1954 |
| 2,683,184 | Boswell | July 6, 1954 |
| 2,712,565 | Williams | July 5, 1955 |
| 2,816,153 | Kort | Dec. 10, 1957 |
| 2,831,046 | Linton | Apr. 15, 1958 |
| 2,862,039 | Ensign et al. | Nov. 25, 1958 |
| 2,880,259 | Nowatny | Mar. 31, 1959 |
| 2,909,586 | Hagspihl | Oct. 20, 1959 |